United States Patent
Sun (10) Patent No.: US 11,049,340 B2
(45) Date of Patent: Jun. 29, 2021

(54) SYSTEM AND METHOD FOR MONITORING AND TRACKING USE OF TRAILER LIFT DEVICES

(71) Applicant: David R. Sun, Placentia, CA (US)

(72) Inventor: David R. Sun, Placentia, CA (US)

(*) Notice: Subject to any disclaimer, the term of this patent is extended or adjusted under 35 U.S.C. 154(b) by 800 days.

(21) Appl. No.: 15/865,566

(22) Filed: Jan. 9, 2018

(65) Prior Publication Data

US 2018/0268627 A1    Sep. 20, 2018

Related U.S. Application Data

(60) Provisional application No. 62/472,825, filed on Mar. 17, 2017.

(51) Int. Cl.
| | |
|---|---|
| *B60S 9/08* | (2006.01) |
| *G07C 5/12* | (2006.01) |
| *B60S 9/06* | (2006.01) |
| *B60Q 11/00* | (2006.01) |
| *B62D 53/06* | (2006.01) |
| *G07C 5/00* | (2006.01) |

(52) U.S. Cl.
CPC ............... *G07C 5/12* (2013.01); *B60Q 11/00* (2013.01); *B60S 9/06* (2013.01); *B60S 9/08* (2013.01); *B62D 53/062* (2013.01); *G07C 5/008* (2013.01)

(58) Field of Classification Search
CPC .......... G07C 5/12; G07C 5/008; G07C 5/085; B60Q 11/00; B60S 9/08; B60S 9/06; B66F 3/18; B66F 3/44
See application file for complete search history.

(56) References Cited

U.S. PATENT DOCUMENTS

| | | | | | |
|---|---|---|---|---|---|
| 3,259,364 | A | * | 7/1966 | Hulverson | B60S 9/16 254/419 |
| 3,680,836 | A | * | 8/1972 | Amelotte | B60P 3/36 254/426 |
| 4,863,184 | A | * | 9/1989 | Mena | B60S 9/08 280/475 |
| 5,488,352 | A | * | 1/1996 | Jasper | H01R 13/6633 340/431 |
| 6,010,154 | A | * | 1/2000 | Payne | B25B 13/48 279/904 |

(Continued)

FOREIGN PATENT DOCUMENTS

WO    WO-03047952 A1 *    6/2003    ........... B62D 53/125

*Primary Examiner* — Steve Clemmons
(74) *Attorney, Agent, or Firm* — Marcus C. Dawes (57) ABSTRACT

A system for monitoring the use of one or more lift devices used for raising or lowering the landing gear of a semi-trailer. A data management module within the system includes a suite of features which are used to take received lift device data and convert it into an easily understood graphical representation. Each lift device is configured to transmit data related to its operation to the data management module of the system which then displays the lift device data as a graphical representation and/or data set according to the type of user using the system. The lift device data which is displayed to the user can include an amount of torque applied to the lift device, the number of times the lift device has been activated, or any other data point which gives the user an overall snapshot of the performance of the lift device(s) under their control.

20 Claims, 5 Drawing Sheets

(56) References Cited

U.S. PATENT DOCUMENTS

| | | | | |
|---|---|---|---|---|
| 6,224,103 B1* | 5/2001 | Hatcher | ............... | B60S 9/08 |
| | | | | 254/419 |
| 7,163,207 B2* | 1/2007 | Baird | ............... | B60P 1/56 |
| | | | | 254/419 |
| 7,911,330 B1* | 3/2011 | Perten | ............... | B60Q 11/00 |
| | | | | 340/431 |
| 8,620,518 B2* | 12/2013 | Bradley | ............... | G07C 5/008 |
| | | | | 701/32.2 |
| 8,827,309 B1* | 9/2014 | Ouellet | ............... | B60S 9/08 |
| | | | | 280/763.1 |
| 8,957,770 B2* | 2/2015 | Hu | ............... | H04L 67/12 |
| | | | | 340/431 |
| 8,972,097 B2* | 3/2015 | McQuade | ............... | G08G 1/20 |
| | | | | 701/29.6 |
| 9,242,622 B1* | 1/2016 | Sanders | ............... | B60S 9/08 |
| 9,305,407 B1* | 4/2016 | Walton | ............... | G07C 5/08 |
| 2004/0104729 A1* | 6/2004 | Johansson | ............... | B60Q 11/005 |
| | | | | 324/504 |
| 2011/0281522 A1* | 11/2011 | Suda | ............... | G06Q 10/0833 |
| | | | | 455/41.2 |
| 2017/0001603 A1* | 1/2017 | Chen | ............... | B60S 9/08 |
| 2017/0015285 A1* | 1/2017 | Nebel | ............... | B66F 3/247 |
| 2018/0178366 A1* | 6/2018 | Matei | ............... | A47L 9/2884 |
| 2018/0181096 A1* | 6/2018 | Harris | ............... | B66F 3/44 |
| 2019/0172008 A1* | 6/2019 | Hage | ............... | G01D 21/02 |
| 2020/0055357 A1* | 2/2020 | Laine | ............... | B62D 15/0285 |
| 2020/0294401 A1* | 9/2020 | Kerecsen | ............... | G05D 1/0287 |

* cited by examiner

SYSTEM AND METHOD FOR MONITORING AND TRACKING USE OF TRAILER LIFT DEVICES

BACKGROUND

Field of the Technology

The invention relates to the field of trailer lift devices, in particular to a system which monitors and tracks the use of trailer lift devices.

Description of the Prior Art

Semi-trucks and other cargo trucks are crucial for delivering goods and supplies to and from various ports and harbors or across the country. Indeed, semi-trailers not only transport goods throughout the country from distribution centers to warehouses, they are also used to perform shipping logistics for an untold number of businesses all over the globe. Typically, when a semi-truck arrives at its destination, a set of landing gear disposed on the underside of the semi-trailer portion are lowered to the ground and any air or electrical connections between the semi-trailer and the tractor unit are disconnected. The tractor unit is then free to move or drive away, leaving the semi-trailer stationary in place to be unloaded or loaded as needed.

Because shipping and the delivery of goods have increasingly become integral to the economy at large, the efficient use of semi-trailers and other cargo delivery vehicles has become critical. Currently, the landing gear disposed on the underside of an untold number of semi-trailers exist as analog structural components which remain unconnected to any sort of network or system, forcing users who come across a broken or degraded set of landing gear to either repair or replace the landing gear entirely, thus significantly reducing the amount of time that that specific semi-trailer could be used for the active transportation of goods. Furthermore, even if a set of landing gear is currently in good working order, it is impossible to tell what relative condition the landing gear is in or what the relative amount of use associated with a particular set of landing gear.

What is needed therefore is a system which monitors the devices which are used to operate a semi-trailer's landing gear and which simultaneously provides a user a visual representation of various statistics associated with that particular set of landing gear. The system should also be able to track and monitor a large number of different landing gear lift devices, each of which is associated with a semi-trailer, thereby giving large shipping companies and the like direct knowledge of the real-time use and condition of any device being used to raise or lower the landing gear on their semi-trailers. Finally, the system should allow for a global administrator to monitor the use of any landing gear lift device which the system has been connected to.

BRIEF SUMMARY

The current invention is a system for monitoring the use of one or more lift devices used for raising or lowering the landing gear of a semi-trailer. A data management module within the system includes a suite of features which are used to take received lift device data and convert it into an easily understood graphical representation. Each lift device is configured to transmit data related to its operation to the data management module of the system which then displays the lift device data as a graphical representation and/or data set according to the type of user using the system. The lift device data which is displayed to the user can include an amount of torque applied to the lift device, the number of times the lift device has been activated, or any other data point which gives the user an overall snapshot of the performance of the lift device(s) under their control.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
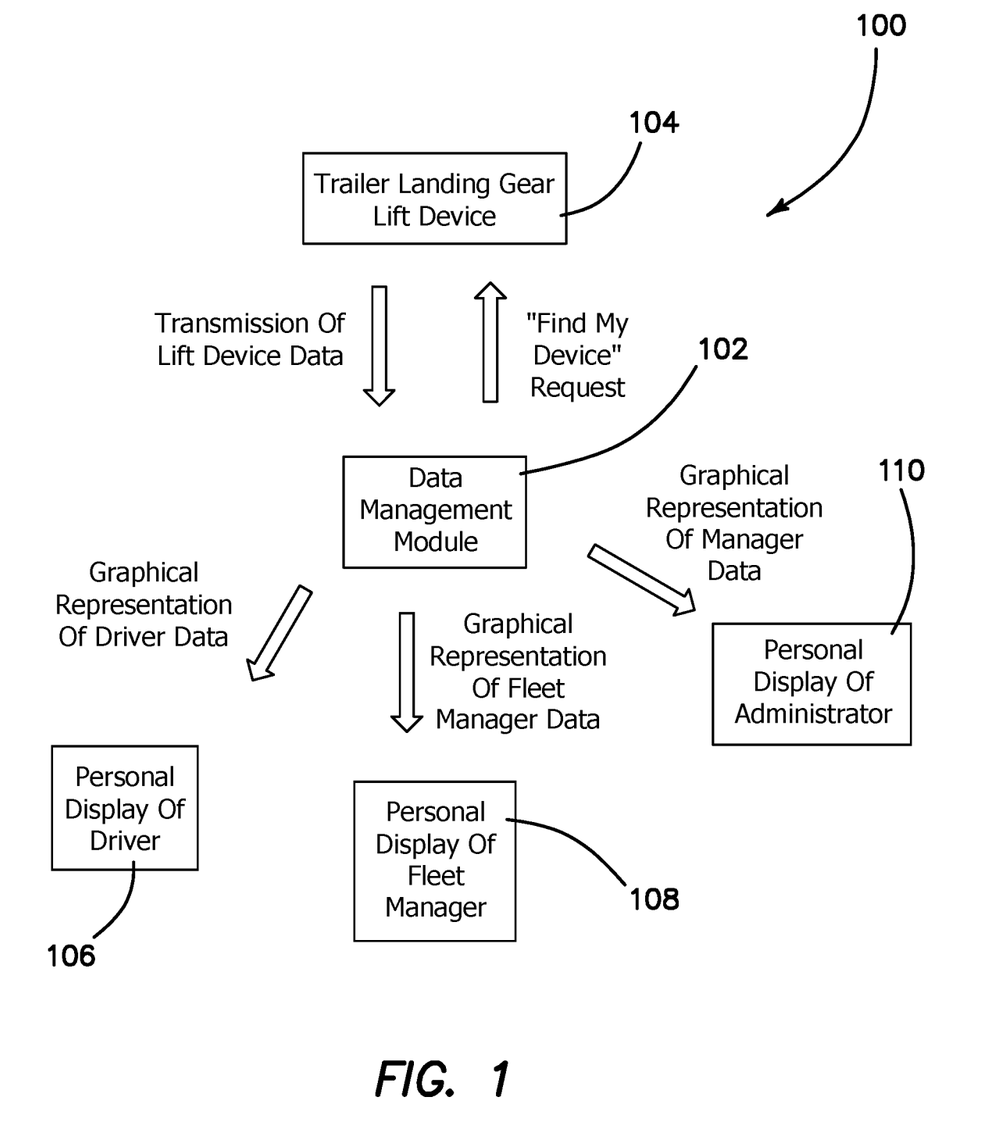
FIG. 1 is a flow diagram of the method used by the current system.

Greater understanding of the current invention may be seen by turning to FIG. 1 which shows a flow diagram of the basic operation of the system which is denoted generally by reference numeral 100. The system 100 comprises a data management module 102 wirelessly coupled or connected to a lift device 104 used to raise or lower at least one set of landing gear for a semi-trailer or other cargo carrying device. The data management module 102 is preferably connected to the lift device 104 via a wireless Blue Tooth® connection, however in an alternative embodiment, the data management module 102 may be directly connected to the lift device 104 through one or more wires or cords.

The data management module 102 itself is a suite of software features which is contained within the hardware of a personal computer, hard disk or thumb drive, or more preferably, a personal electronic device such as a smart phone, tablet, or other similar device which comprises a screen or other means for displaying data and/or graphical representations. In an alternative embodiment, instead of being disposed or stored within a personal electronic device of a user, the data management module 102 may be disposed or stored in a central electronic device which is in turn connected or coupled to the personal electronic device of one or more users.

As seen in FIG. 1, the data management module 102 is configured to transmit or display a graphical representation and/or data on at least one personal display of a driver 106, at least one personal display of a fleet manager 108, and/or at least one personal display of an administrator 110. For the purposes of this description, the term "driver" refers to the person or persons who drive the tractor towing the semi-trailer on which the lift device 104 is disposed or connected to. The term "fleet manager" refers to the person or entity who owns and operates a plurality of semi-trailers, for example a shipping corporation, a moving company, or other retailer. The term "administrator" refers to the person or entity which manufactures and distributes the data management module 102 to the drivers and/or the fleet managers for their use. The data management module 102 is configured to differentiate between the drivers, the fleet managers, and the administrator so that different sets of data or graphical representations may be displayed for each type of user according to their type. Stated differently, the data management module 102 will display a different data set or set of graphical representations depending on who the intended recipient of that data is, namely the driver, the fleet manager, or the administrator.

Figure 2:
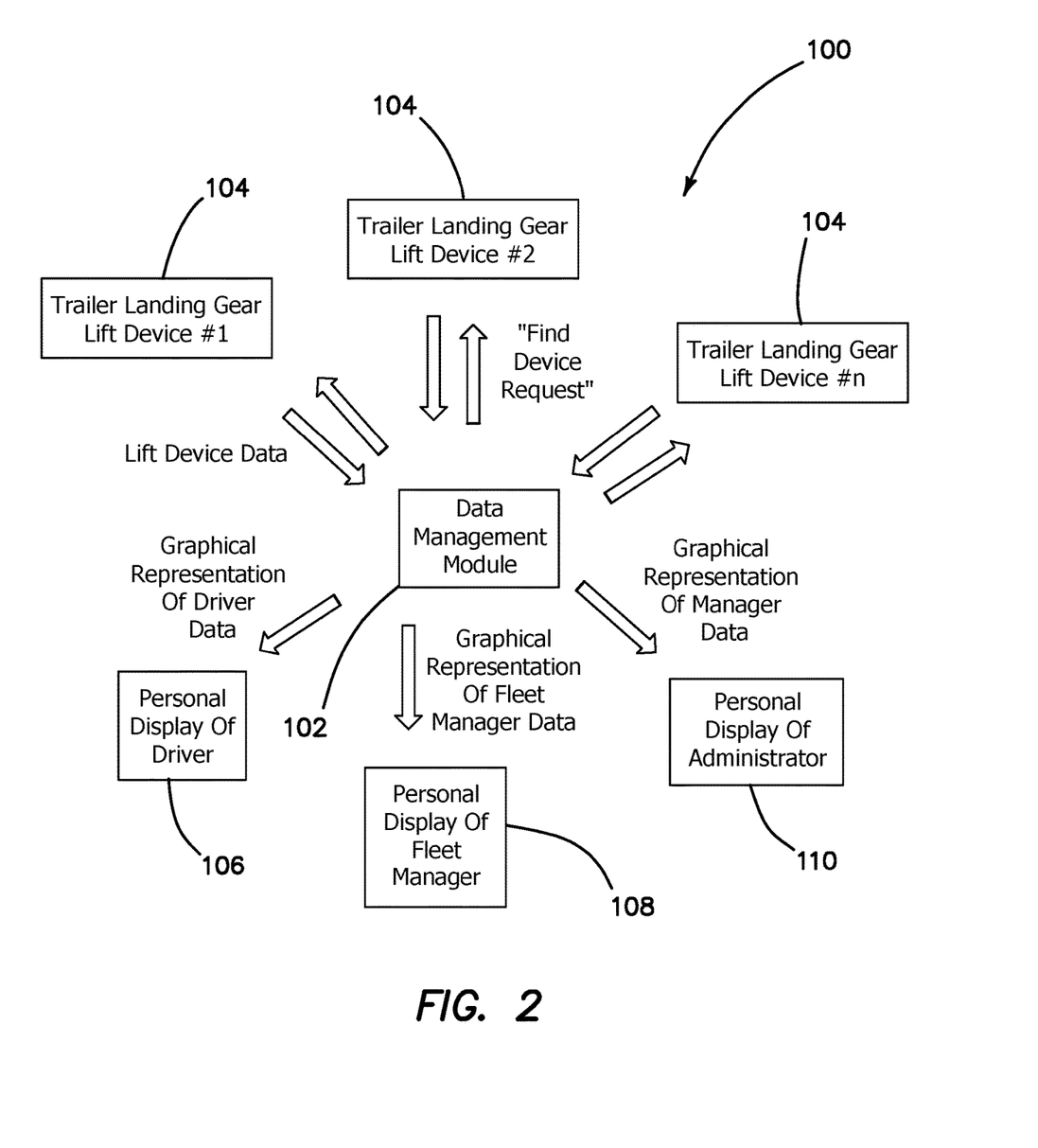
FIG. 2 is a flow diagram of an alternative embodiment of the system seen in FIG. 1.

FIG. 2 shows a related embodiment of the system comprising a plurality of lift devices 104 all wireless connected to a common data management module 102. Each lift device 104 is connected to the data management module 102 in the same manner as discussed above and is configured to transmit lift device data to the data management module 102 and receive various commands from the data management module 102 including but not limited to a "find my device" request as is known in the art. With a plurality of lift devices 104 connected to the data management module 102, the user may use the data management module 102 to select to view the data of a single lift device 104, a subset of the plurality of lift devices 104, or the entire plurality or n number of lift devices 104.

Figures 3, 4:
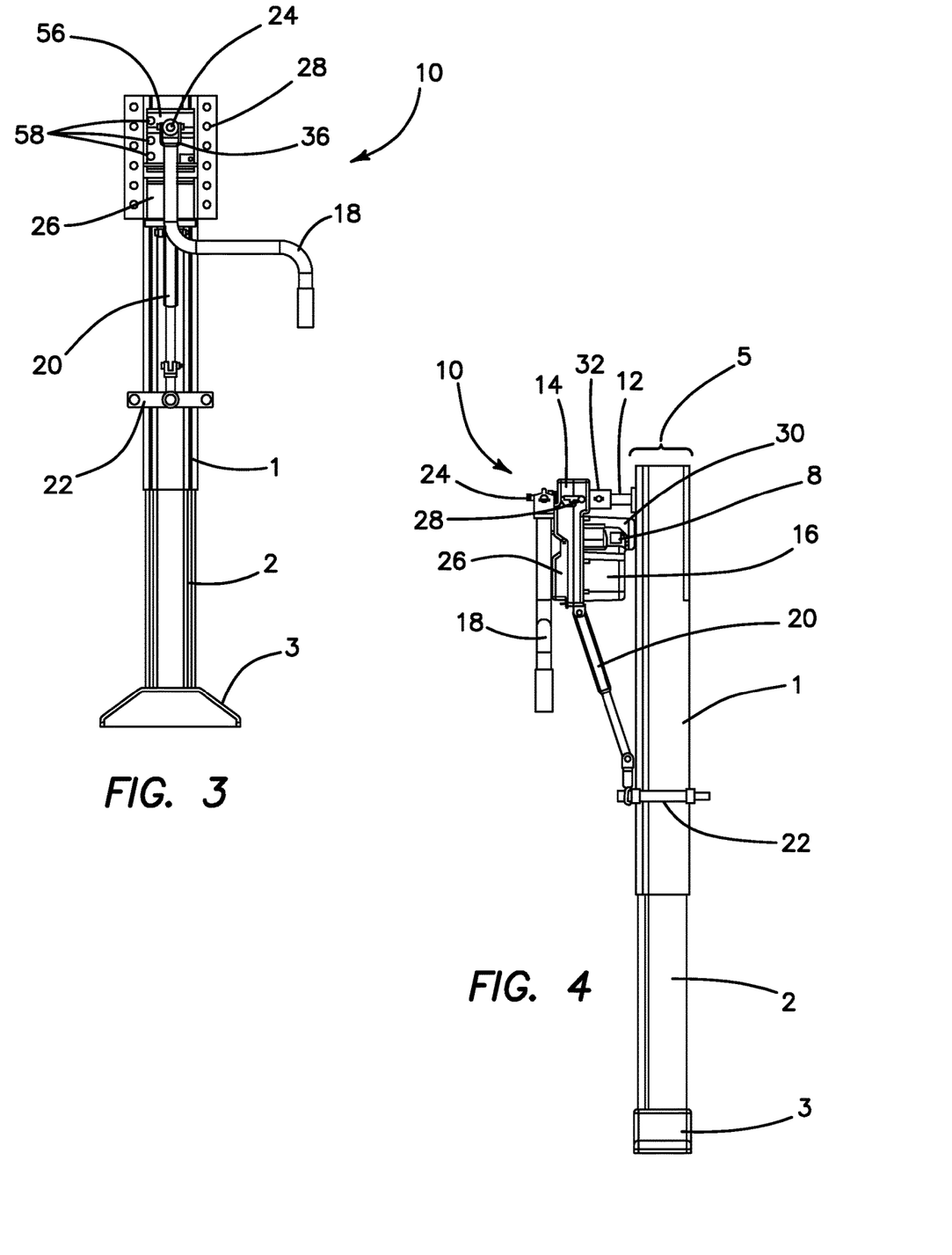
FIG. 3 is a frontal view of a first embodiment of a lift device which is monitored and tracked by the current system.
FIG. 4 is a side view of the lift device seen in FIG. 3.

A specific example of a lift device 104 used to raise or lower the landing gear of a semi-trailer may be seen in FIGS. 3 and 4. Here, the lift device 104 is comprised of a dual drive mechanism 10 comprising a gearbox 14, a motor housing 30, a battery housing 16, and a handle 18. The drive shaft 12 of the landing gear is inserted into the gearbox 14 through a drive shaft aperture 32 and into a distal portion of the handle shaft 24. The drive shaft 12 is locked into place within the draft shaft aperture 32 and handle shaft 24 via a removable pin which is threaded through both drive shaft 12 and the drive shaft aperture 32. Disposed on the opposing side of the gearbox 14 and coaxial relative to the draft shaft 12 is a hexagonal handle shaft 24 which extends perpendicularly relative to the outward facing surface of the gearbox 14. Coupled to the distal end of the handle shaft in turn is a handle 18 via a rotatable U-shaped joint 36. The gearbox 14 further comprises a shift lever 28 which extends outwardly from the gearbox 14 as seen in FIG. 3. Integrally formed with the gearbox 14 is the motor housing 30 and the battery housing 16 which house or accommodate the motor components and the battery, respectively. In addition to the drive shaft 12 being inserted into the gearbox 14, the dual drive mechanism 10 is further coupled to the leg 5 by a brace 20 which is coupled to a bottom portion of the battery housing 16 at one end and to a bracket 22 at its opposing end. The bracket 22 is coupled to the upper portion 1 of the leg 5 via a standard set of bolts or other fasteners as is known in the art. The brace 20 provides additional structural support to the dual drive mechanism 10 as well as prevents extraneous movement of the dual drive mechanism 10 while it is applying torsion forces to the drive shaft 12. The brace 20 additionally comprises a telescoping length which allows the brace 20 to be coupled to the bracket 22 at a variety of positions or heights along the upper portion 1 of the leg 5.

As also seen in FIG. 4, the dual drive mechanism 10 further comprises an electronics unit 8 disposed on the outside of the motor housing 30, however in an alternative embodiment, the electronics unit 8 may be disposed or incorporated into the internal components of the motor housing 30 or the battery housing 16. The electronics unit 8 comprises a suite of electronic components which includes but is not limited to an antenna, a Blue Tooth® device, or other transceiver, a microcontroller, a memory storage device or chip, a GPS unit, a clock or timer, one or more force/torque sensors, and other related support circuitry. The electronics unit 8 is configured to be electronically connected or coupled to the various internal components of the dual drive mechanism 10 including a battery disposed within the battery housing 16, the drive shaft 12, and the various internal components of the gearbox 14.

The electronics unit 8 is further configured to track, monitor, and then record the use and movement of the components of the dual drive mechanism it is connected to. For example, each time the drive shaft 12 is activated, the electronics unit 8 records the time and date of use, the duration of time the drive shaft 12 is rotated, and how fast the drive shaft 12 is rotated, i.e. the amount of torque that has been applied to the drive shaft 12. Additionally, the electronics unit 8 is configured to monitor and record within its internal memory other operations occurring within the dual drive mechanism 10 including the relative charge remaining on the battery within the battery housing 16, the current location of the dual drive mechanism 10 as determined by the GPS unit, and the frequency of any alerts or automatically triggered device shut offs experienced by the dual drive mechanism 10.

Figures 5, 6:
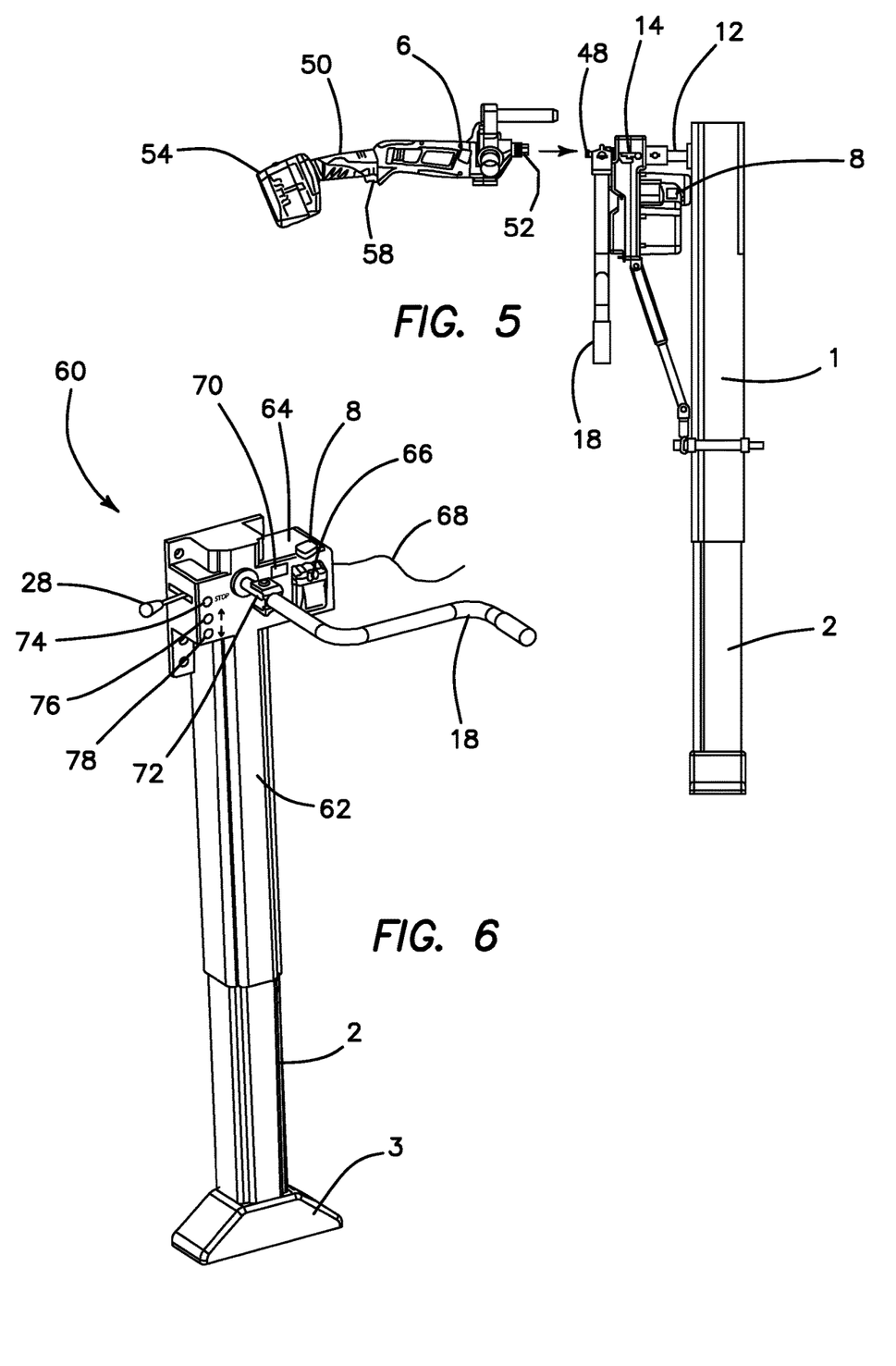
FIG. 5 is a side view of an alternative embodiment of a lift device including a hand tool.
FIG. 6 is a perspective view of an alternative embodiment of a lift device wherein the lift device is incorporated into the landing gear of a semi-trailer.

An alternative embodiment of the lift device 104 may be seen in FIG. 5 which comprises an electric hand tool 50 comprising a substantially hexagonal aperture 52 that may be pressed against the handle shaft 24 until the hexagonal tip 48 enters the hexagonal aperture 52. The hand tool 50 may then be activated through the compression of a trigger 58 or other equivalent activation means which then begins to rotate the handle shaft 24 through the coupling formed by the hexagonal aperture 52 and tip 48. The rotational movement of the handle shaft 24 is then translated to the drive shaft 12. The hand tool 50 may rotate or spin the motorized aperture 52 in either the clockwise or counterclockwise orientation as is known in the art. Similar to the previous embodiment discussed above, the rotation of the handle shaft 24 by the hand tool 50 in turn rotates the drive shaft 12 which raises or lowers the landing gear of the semi-trailer accordingly. To disengage the hand tool 50, the user pulls the hand tool 50 away from the drive shaft 12 and removes the hexagonal tip 48 from the aperture 52. The user may recouple the hand tool 50 if necessary or alternatively, continue to rotate the drive shaft 12 by means of the handle 18 or the motorized gear assembly 38 as discussed above. The hand tool 50 is preferably powered by a rechargeable battery 54 that is separate from the battery 16 used to power the motor 30.

As also seen in FIG. 5, the hand tool 50 further comprises a hand tool electronics unit 6 disposed on its outside surface, however in an alternative embodiment, the hand tool electronics unit 6 may be disposed or incorporated into the internal components of the hand tool 50 itself. The hand tool electronics unit 6 comprises a suite of electronic components which includes but is not limited to an antenna, a Blue Tooth® device, or other transmitter, a microcontroller, a memory storage device or chip, a GPS unit, a clock or timer, one or more force/torque sensors, and other related support circuitry. The hand tool electronics unit 6 is configured to be electronically connected or coupled to the various internal components of the hand tool 50 including the rechargeable battery 54, the motorized aperture 52, and the trigger 58.

The hand tool electronics unit 6 is further configured to track, monitor, and then record the use and movement of the components of the hand tool 50 it is connected to. For example, each time the trigger 58 is activated, the hand tool electronics unit 6 records the time and date of use and the duration of time the motorized aperture 52 is rotated. Additionally, the hand tool electronics unit 6 is configured to monitor and record within its internal memory other operations occurring within the hand tool 50 including the relative charge remaining on the battery 54, the current location of the hand tool 50 as determined by the GPS unit, and the frequency of any alerts or automatically triggered device shut offs experienced by the hand tool 50. The hand tool electronics unit 6 is further configured to interact with the electronics unit 8 disposed on the dual drive mechanism 10 so that an entire range of data for both the hand tool 50 and dual drive mechanism 10 may be provided to the data management module 102.

Yet another alternative embodiment of the lift device 104 may be seen in FIG. 6 which comprises an alternative dual drive mechanism 60 that is incorporated into the structure of the upper portion 62 of the landing gear itself. Here, the drive shaft of the landing gear is disposed within the upper portion 62 and coupled to a handle shaft 72 which protrudes from the face of the motor housing 64. A shift lever 28 is disposed on one lateral side of the motor housing 64 which, like in the previous embodiment described above, cooperates with the internal components of the motor housing 64 to alternate the drive function of the device. The front face of the motor housing 64 further comprises a battery indicator light 66, an "up" button 76, a "down" button 78, and a "stop" or "off" button 74. A display screen 66 is also optionally disposed within the front face of the motor housing 64. Additionally, a wire 68 is coupled to the dual drive mechanism 60 at one end and to the electronics of the tractor unit at the opposing end. When the wire 68 is properly connected and when the tractor unit is activated or in use as is known in the art, the wire 68 charges a rechargeable and removable battery disposed within the motor housing 64 of the dual drive mechanism 60.

To raise or contract the lower portion 2 of the leg 5 and raise the foot 3 from the ground using the embodiment seen in FIG. 6, the user pushes an "up" button 76 which then activates a motor within the motor housing 64 and begins to turn a gear assembly and collar which in turn rotates the handle shaft 72 in the direction corresponding to the user's latest input command. It can be appreciated that the motorized gear assembly and collar will turn the handle shaft 72 and drive shaft in two separate directions, namely a direction which corresponds to the user actuating the "down" button 78 and a different direction which corresponds to the user actuating the "up" button 76. The rotation of the drive shaft lifts or retracts the lower portion 2 into the upper portion 1 of the leg 5 as is known in the art. The motorized gear assembly and collar continually rotates the drive shaft in the selected direction for as long as the user depresses or actuates the "up" button 76, until the lower portion 2 is fully nested within the upper portion 62, or alternatively, for a predetermined amount of time as dictated by an internal memory or microcontroller disposed within the motor housing 64 as is known in the art.

As also seen in FIG. 6, the dual drive mechanism 60 further comprises an electronics unit 8 disposed on its outside surface, however in an alternative embodiment, the electronics unit 8 may be disposed or incorporated into the internal components of the dual drive mechanism 60 itself. The electronics unit 8 comprises a suite of electronic components which includes but is not limited to an antenna, a Blue Tooth® device, or other transmitter, a microcontroller, a memory storage device or chip, a GPS unit, a clock or timer, one or more force/torque sensors, and other related support circuitry. The electronics unit 8 is configured to be electronically connected or coupled to the various internal components of the dual drive mechanism 60 including the battery, the handle shaft 72, and the plurality of buttons 74, 76, 78.

The electronics unit 8 is further configured to track, monitor, and then record the use and movement of the components of the dual drive mechanism 60 it is connected to. For example, each time the handle shaft 72 is activated, the electronics unit 8 records the time and date of use and the duration of time the handle shaft 72 is rotated. Additionally, the electronics unit 8 is configured to monitor and record within its internal memory other operations occurring within the dual drive mechanism 60 including the relative charge remaining on the battery, the current location of the dual drive mechanism 60 as determined by the GPS unit, and the frequency of any alerts or automatically triggered device shut offs experienced by the dual drive mechanism 60.

While three separate and distinct embodiments of lift devices 104 used to raise and lower the landing gear of a semi-trailer are described above, it is to be expressly understood that alternative lift devices now known or later devised could be used without departing from the original spirit and scope of the invention. For example, an alternative lift device not specifically describe here could be outfitted with a type of electronics module as is disclosed above and wirelessly connected to the data management module 102 to provide a substantially similar result as is discussed here, provided that the internal suite of electronics disposed within the electronics module is tailored to monitor and record the use of the implemented lift device 104.

The data management module 102 comprises a plurality of user interface elements and settings which allow the driver, the fleet manager, and/or the administrator to view usage data associated with one or more lift devices 104. The data management module 102 is configured to receive data transmitted from the electronics unit 6, 8 via the receiver or antenna disposed on the device in which the data management module 102 is disposed or installed. After receiving the data, the data management module 102 organizes the data into discrete, predetermined categories according the type of user using the system 100. For example, if the user is a driver, the data management module 102 will only organize data related to the specific lift device 104 which that driver used as opposed to when the user is a fleet manager in which case the data management module 102 will organize data related to all of the lift devices 104 that are within their fleet or control.

Figure 7:
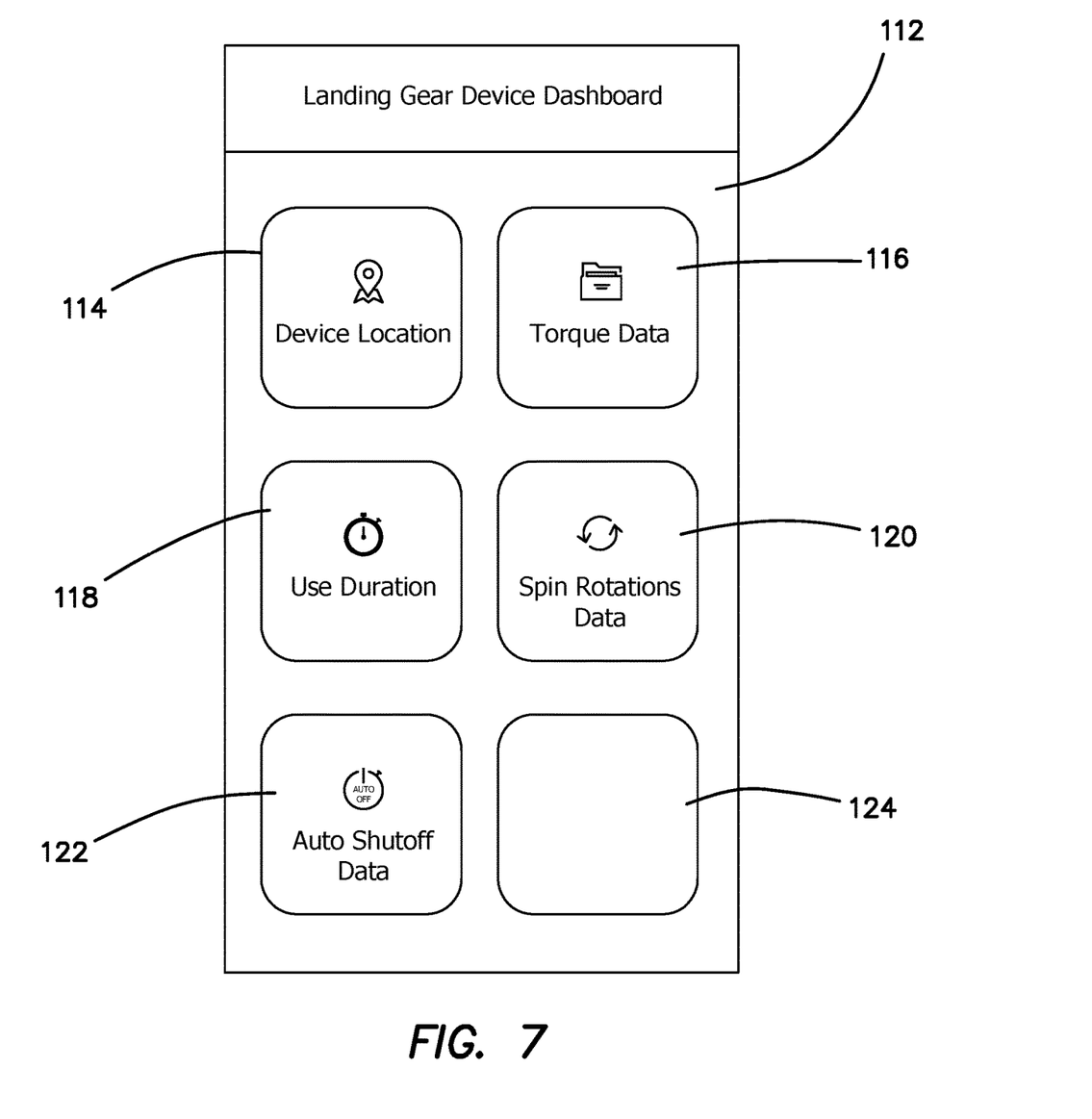
FIG. 7 is an illustration of the interface of the data management module of the current system used to track and monitor a lift device.

After the received data has been properly sorted according to user type, the data management module 102 is configured to then perform a plurality analytical functions on the received data as dictated by the user via a plurality of user interface options within an interactive menu or dashboard 112 as seen in FIG. 7. The data management module 102 then displays a graphical representation or list of the analyzed data on the user's electronic device, the graphical representation or data list corresponding to the specifically received user input.

For example, in one embodiment, the user selects a device location button 114 disposed within the interactive dashboard 112. The data management module 102 then transmits a "find my device" request to the lift device 104 which as discussed above, can specifically be the dual drive mechanism 10, 60, the hand tool 50, or any other lift device. As is known in the art, the lift device 104 uses its respective electronics unit 6, 8 to determine its physical location and then sends that data to the data management module 102. The data management module 102 then displays the location of the lift device 104 on the driver display 106, the fleet manager display 108, and/or the administrator display 110 via a textual display or more preferably, by displaying the specific location of the lift device 104 within a map or other graphical image.

In an alternative embodiment, the interactive dashboard 112 comprises a torque data button 116. When this feature is selected, the data management module 102 displays the various types of data associated with the amount of torque applied to one or more selected lift devices 104, for example the average amount of foot pounds of torque applied to the lift device 104 over a single use, a day, a week, or some other specified unit of time. The data management module 102 displays the torque data of the lift device 104 on the driver display 106, the fleet manager display 108, and/or the administrator display 110 via a textual display or more preferably, via a graphical image such as a bar graph, pie chart, line graph, or other appropriate visualization of data.

In yet another embodiment, the interactive dashboard 112 comprises a use data button 118. When this feature is selected, the data management module 102 displays the various types of use data associated with the one or more selected lift devices 104, for example the number of times the lift device 104 is used over a single use, a day, a week, or some other specified unit of time. Additionally, the data management module 102 is configured to display the total amount of time the lift device 104 is used over its operational life span, much like an odometer for an automobile. The data management module 102 displays the use data of the lift device 104 on the driver display 106, the fleet manager display 108, and/or the administrator display 110 via a textual display or more preferably, via a graphical image such as a bar graph, pie chart, line graph, or other appropriate visualization of data.

In yet another embodiment, the interactive dashboard 112 comprises a spin rotations data button 120. When this feature is selected, the data management module 102 displays the various types of rotational data associated with the one or more selected lift devices 104, for example the number of rotations experienced by the lift device 104 over a single use, a day, a week, or some other specified unit of time. Additionally, the data management module 102 is configured to display the total amount of rotations completed by the lift device 104 over its operational life span, much like an odometer for an automobile. The data management module 102 displays the spin rotation data of the lift device 104 on the driver display 106, the fleet manager display 108, and/or the administrator display 110 via a textual display or more preferably, via a graphical image such as a bar graph, pie chart, line graph, or other appropriate visualization of data.

In yet another embodiment, the interactive dashboard 112 comprises an auto shutoff data button 122. For the purposes of this description, "auto shutoff" refers to a condition reached by the lift device 104 when a predetermined threshold has been reached or when a certain stated condition has been achieved. For example, the user can adjust the settings of the lift device 104 as is known in the art to automatically shut off when a predetermined condition has been reached, namely when a threshold amount of torque has been applied or after the lift device 104 has been continuously activated for a certain preselected amount of time. When the auto shutoff button 122 is selected, the data management module 102 displays the various types of auto shutoff data associated with the one or more selected lift devices 104, for example the number of auto shutoffs experienced by the lift device 104 over a single use, a day, a week, or some other specified unit of time. Additionally, the data management module 102 is configured to display the frequency of different types of auto shutoffs performed by the lift device 104, for example the number of times the lift device 104 was automatically shut off because of improper use by the user or because a consistently high amount of torque has been applied to the lift device over a specified period of time. The data management module 102 displays the auto shutoff data of the lift device 104 on the driver display 106, the fleet manager display 108, and/or the administrator display 110 via a textual display or more preferably, via a graphical image such as a bar graph, pie chart, line graph, or other appropriate visualization of data.

In another embodiment, the interactive dashboard 112 comprises an overall performance button 124. When this feature is selected, the data management module 102 displays a plurality of any other data associated with the one or more selected lift devices 104, for example the overall condition or performance of the lift device 104. The data management module 102 displays the overall performance data of the lift device 104 on the driver display 106, the fleet manager display 108, and/or the administrator display 110 via a textual display or more preferably, via a graphical image such as a bar graph, pie chart, line graph, or other appropriate visualization of data.

As discussed above, when any of the buttons 112-124 are selected, the data management module 102 displays data according to who the ultimate user is. For example, if the user is a driver, the data management module 102 will only display data which is relevant to the lift device 104 which is under the driver's direct control. If the user is a fleet manager, the data management module 102 will instead only display data which is relevant to the lift devices 104 which the fleet manager owns and/or controls. Finally, if the user is an administrator, the data management module 102 displays data for every manufactured lift device 104 in existence, regardless of which individual or entity owns and/or operates the lift devices 104 or any subset thereof.

Using the data and graphical images generated and displayed by the data management module 102, the user may use the displayed information for any number of purposes including but not limited to providing insurance companies and the like the necessary information to generate an insurance policy for the user. For example, by providing an insurance company with the number of times a certain lift device has been automatically shut off, the insurance company can offer the user an insurance policy that will adequately cover the user's operation of said lift device. Furthermore, a user viewing the information displayed by the data management module 102 gives the user an overall sense of the general condition of not only the lift device 104, but also the landing gear, the semi-trailer, or any other component used to transport or maintain the semi-trailer and/or tractor. In other words, because the user for example knows how many times the lift device 104 has been activated over the course of its operational life, the user can then divine the relative age and/or condition of any related component of the semi-trailer and take proactive steps so as to maintain the semi-trailer in peak operating condition.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. A system for monitoring and tracking at least one lift device coupled to a landing gear of a semi-trailer comprising:
    at least one lift device, the at least one lift device configured to raise and lower the landing gear of the semi-trailer;
    at least one electronics unit coupled to the at least one lift device and wirelessly connected to a data management module;
    a bracket removably coupled to an upper portion of the landing gear; and
    a telescoping brace comprising a distal and a proximal end, wherein the proximal end is coupled to a lower portion of the at least one lift device and wherein the distal end is removably coupled to the bracket,
    wherein the data management module is connected to at least one display associated with a driver, at least one display associated with a fleet manager, and at least one display associated with an administrator, and
    wherein the data management module is configured to send a different set of data to each of the driver, the fleet manager, and the administrator.

2. The system of claim 1 wherein the at least one electronics unit comprises:
    a microcontroller;
    a wireless transceiver coupled to the microcontroller;
    a GPS unit coupled to the microcontroller;
    a memory storage device coupled to the microcontroller; and
    at least one force sensor coupled to the microcontroller.

3. The system of claim 1 wherein the at least one display associated with the driver, the at least one display associated with the fleet manager, or the at least one display associated with the administrator is a smart phone, tablet, or personal computer.

4. The system of claim 1 wherein the data management module is contained within a personal electronics device.

5. The system of claim 1 wherein the at least one lift device comprises a drive mechanism removably coupled to the landing gear of the semi-trailer.

6. The system of claim 5 wherein the at least one lift device comprises a removable hand tool and at least one electronics unit coupled to the hand tool.

7. The system of claim 1 wherein the at least one lift device comprises a drive mechanism incorporated into a body portion of the landing gear of the semi-trailer.

8. Method for tracking and monitoring at least one lift device comprising:
    connecting at least one lift device to a landing gear of a semi-trailer, the at least one lift device configured to raise and lower the landing gear;
    connecting the at least one lift device to a data management module;
    transmitting data related to the lift device from the lift device to the data management module;
    producing at least one graphical image based on the transmitted data; and sending the produced graphical image to a display of a plurality of specified users including at least one driver, at least one fleet manager, and at least one administrator, wherein the data management module is configured to send a different produced graphical image to each of the at least one driver, the at least one fleet manager and the at least one administrator, and wherein connecting the at least one lift device to the landing gear of a semi-trailer comprises:
coupling a removable bracket to an upper portion of the landing gear; and
coupling a proximal end of a telescoping brace to a lower portion of the at least one lift device and coupling a removable distal end of the telescoping brace to the removable bracket.

9. The method of claim 8 wherein producing the at least one graphical image comprises producing a graphical image which corresponds to at least one selection made by at least one of the plurality of specified users made through the data management module.

10. The method of claim 8 wherein sending the produced graphical image to the display of the plurality of specified users comprises displaying the produced graphical image on a screen of a smart phone, tablet, or other personal electronics device.

11. The method of claim 8 further comprising sending a location request signal to the at least one lift device from the data management module.

12. The method of claim 8 further comprising determining a location of the at least one lift device through a GPS unit disposed within the at least one lift device.

13. The method of claim 8 further comprising sensing an amount of force applied to activate the at least one lift device and recording the amount of force applied to activate the at least one lift device.

14. The method of claim 8 further comprising detecting an activation state of the at least one lift device and recording a period of time the at least one lift device is activated.

15. The method of claim 8 further comprising detecting an amount of revolutions of a drive shaft of the at least one lift device.

16. The method of claim 8 further comprising detecting at least one shut off state of the at least one lift device and recording the at least one shut off state of the at least one lift device.

17. A method for tracking and monitoring a plurality of lift devices comprising:
connecting a plurality of lift devices to a corresponding plurality of landing gears of a semi-trailer, each of the plurality of lift devices configured to raise and lower at least one of the plurality of landing gears;
connecting the plurality of lift devices to at least one data management module;
transmitting data related to each of the plurality of lift devices from each of the plurality of lift devices to the at least one data management module;
combining the transmitted data related to the plurality of lift devices to a produce a combined data set;
producing a graphical image based on the combined data set;
sending the produced graphical image to a display of a plurality of specified users including at least one driver, at least one fleet manager, and at least one administrator,
wherein the at least one data management module is configured to send a different produced graphical image to each of the at least one driver, the at least one fleet manager and the at least one administrator, and
wherein connecting each of the plurality of lift devices to each of the corresponding plurality of landing gears of a semi-trailer comprises:
coupling a removable bracket to an upper portion of each of the plurality of landing gears; and
coupling a proximal end of a telescoping brace to a lower portion of each of the plurality of lift devices and coupling a removable distal end of the telescoping brace to the removable bracket.

18. The method of claim 17 further comprising selecting a subset of the plurality of lift devices by at least one of the plurality of specified users.

19. The method of claim 18 wherein combining the transmitted data related to each of the plurality of lift devices to a produce a combined data set further comprises combining the transmitted data related to the selected subset of the plurality of lift devices.

20. The method of claim 17 further comprising determining a location for each of the plurality of lift devices through a GPS unit disposed within each of the plurality of lift devices.

* * * * *